Oct. 23, 1951   P. F. SKOOG   2,572,772
METHOD OF PRODUCING COMPOSITE BOARDS
Filed April 25, 1950   2 SHEETS—SHEET 1
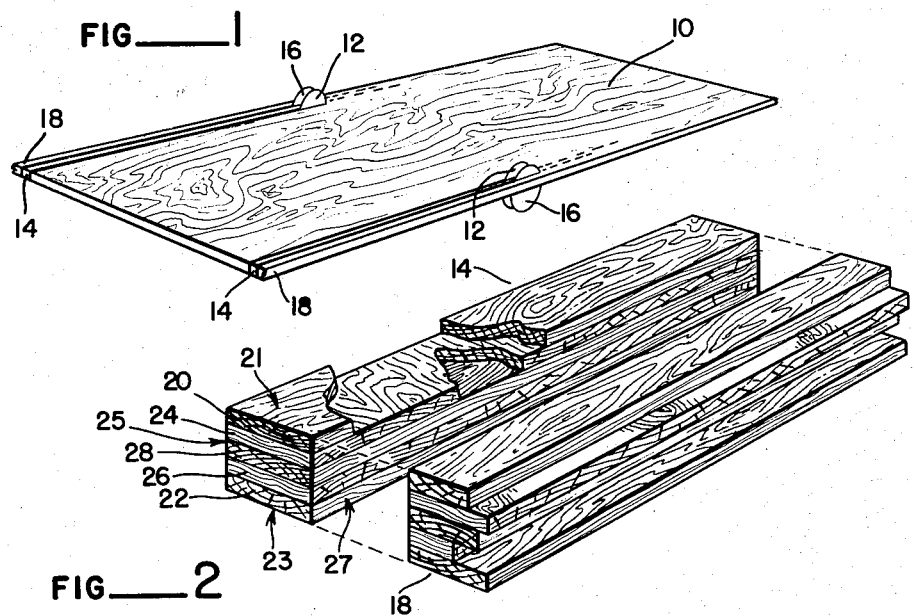
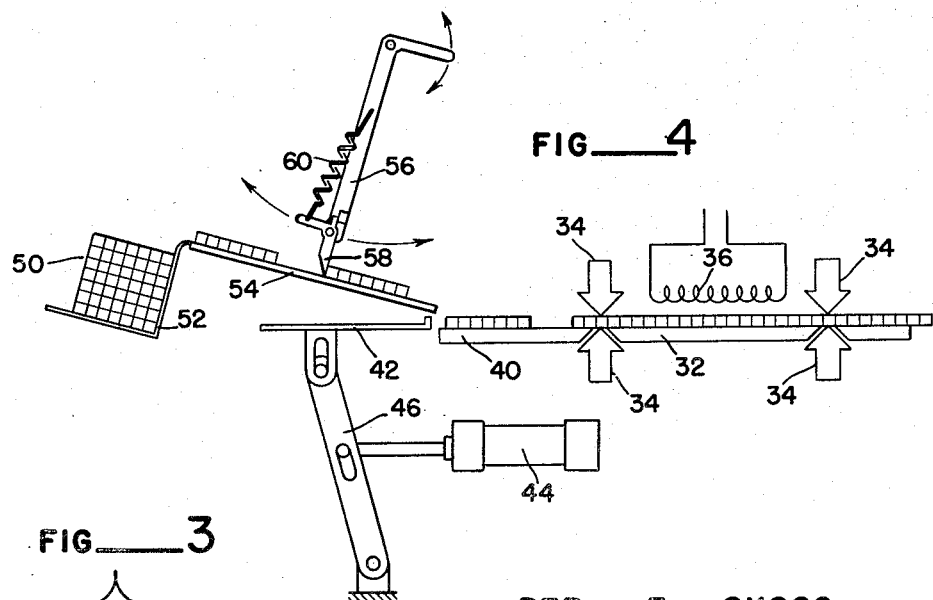
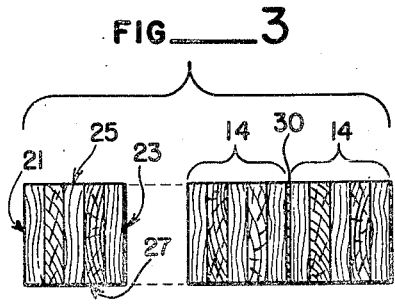
PER F. SKOOG
Inventor
By *Smitt & Tuck*
Attorneys

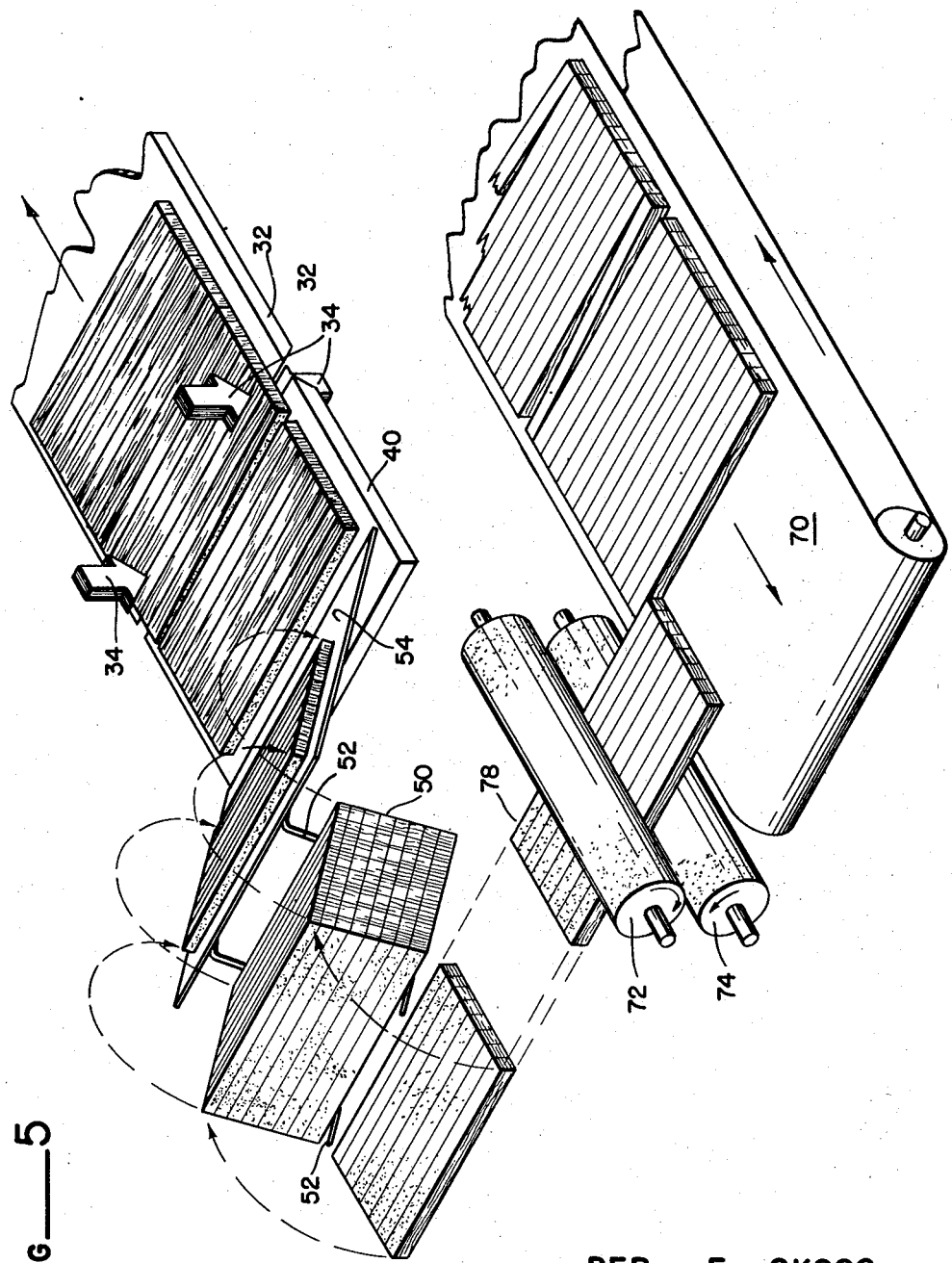

Patented Oct. 23, 1951

2,572,772

UNITED STATES PATENT OFFICE 2,572,772

METHOD OF PRODUCING COMPOSITE BOARDS

Per F. Skoog, Olympia, Wash.

Application April 25, 1950, Serial No. 157,929

6 Claims. (Cl. 154—116)

This invention relates to a method of producing composite boards and, more particularly, is a process of assembling wooden sticks of substantially uniform rectangular cross-section into a board in which the sticks are arranged in substantially parallel relationship and adhesively joined together. Still more particularly the invention has to do with the conversion of sticks salvaged from waste trim of a plywood mill into a composite board that has substantial strength and is free, to a very high degree, of stresses and strains that would otherwise produce warping and distortion.

I shall describe my process in connection with its application to making composite boards from plywood sticks but I wish to point out that the process is not limited to such use, since it will be readily apparent to those skilled in the wood working arts that this process will be equally applicable to the formation of composite boards from all types of sticks that might otherwise be waste. Also the invention may be used in any type of an assembly operation wherein pluralities of sticks are to be joined to make boards.

In the manufacture of composite boards one of the great problems has been the handling of the many pieces that are to be joined into a board through the initial steps of moving the material to the site of the operation, the application of adhesive films to the stick material, and the handling of the material into suitable clamping and glue setting means. The problem is particularly aggravated in connection with plywood sticks formed from trimmings from plywood sheets since these pieces are usually quite small in cross-section and, hence, difficult to handle manually or mechanically. Such sticks are obtained in connection with plywood manufacture due to the fact that after a sheet of plywood has been laid-up and bonded in a press or clamp it is necessary to trim the sheet to specified dimensions. Ordinarily the sheets are initially formed or laid-up of veneers that are from two to four inches larger in both facial dimensions than the finished sheet that will be trimmed therefrom. Since the trimmings are of high grade veneer stocks and are suitably bonded by quality adhesives, their conversion into a useful form is highly desirable if the plywood producer is to obtain the maximum return from his raw materials and labor input in his plywood production. It has been, therefore, a most important object of this invention to produce a method of handling such trim sticks so that economically and practically the material can be converted to useful purposes other than as fuel or the like. The trim strips are, in my process, ripped from the plywood sheet so that they have a substantially uniform cross-section and lengths according to the rough stock from which they are salvaged. Normally such strips will be from ½ to ¾ inch in thickness, approximately ¾ to 1½ inches in width and varying in length between four feet and eight feet depending on whether they are cut from the ends of normal plywood sheet or from its edges. It can readily be seen that in a mill wherein there is large scale production of plywood, the quantities of these relatively small sticks is quite large and that their handling in composite board production presents some substantial problems. One of the main problems resides in handling them to the gluing means and therepast into the press or clamping means in quantities to equal the capacity of the latter means, and it is to the solution of this latter problem that I have particularly applied myself in the development of this invention.

Having in mind the foregoing and other well-known attendant problems it should be seen that the objects of this invention include also the assembling of groups of sticks so that they can be most efficiently handled into and through a glue applicator means; thereafter, to so handle them that in quantities the surfaces between which glue is to be finally set are brought together in correct relation; to so rack the sticks in quantity that the adhesively filmed pieces in quantities may be handled most efficiently into a press in accordance with the capacity of that press means; and to provide a process which is adapted to serve a practically continuous high-capacity press while at the same time not employing undue amounts of labor and employing the minimum in the way of glue applying means in serving the press.

Probably the most important object of the invention lies in the provision of steps in which adhesive film is applied to co-planar like faces of quantities of sticks arranged side-by-side and the rearrangement of these and other like quantities of sticks so that the adhesively filmed faces are disposed between adjacent and juxtaposed stick faces where the adhesive bond is desired in the conversion of the sticks into composite boards. Other objects of the invention, including simplicity of technique and adaptability to various sized pieces of stick stock without interference of the basic steps of the process, will become more apparent from the following specification in which is set forth the preferred and certain alternate steps of my process. For the purposes of graphically illustrating the process I have provided the accompanying drawings, in which:

Figure 1 is a perspective view of the manner in which stick stock may be produced by trimming plywood sheets;

Figure 2 is an enlarged view in perspective of a typical plywood stick of the type used in forming composite boards according to my method;

Figure 3 is a detailed end view showing a preferred arrangement of plywood sticks in the formation of composite boards, and showing the arrangement of grain structures of such sticks in such a board;

Figure 4 is a detailed elevational view schematically showing the press feeding operations in connection with my method; and Figure 5 is a schematic view in perspective of the glue applying and stick racking and handling steps of my method.

In general, bearing in mind that this method applies to wooden sticks of practically any nature having uniform rectangular cross-section as well as to plywood sticks as mentioned above, the method comprises moving pluralities of sticks side-by-side in a path that is perpendicular to the longitudinal axes of the sticks to one side of an adhesive applying station, where adhesive may be either manually or mechanically handled, and then passing end-first groups of such sticks past said adhesive applying station for the filming of said groups of sticks on a face of each that is co-planar with like faces of the other sticks of the group. Alternatively, at this stage of the operation, adhesive may also either sequentially or simultaneously be applied to a second opposite face of each stick to that to which adhesive was otherwise applied and in the same co-planar manner. Thereafter, the groups of sticks are stacked or racked with said groups being arranged so that the adhesively filmed faces are in parallel planes, the longitudinal axes of the sticks are horizontal, and the groups are arranged in side-by-side relation so that the adhesive films lie between faces that are to be joined. Subsequently the sticks are removed from such stacks in stick tiers formed of pluralities of sticks having adhesive films between their adjacent faces but in which tiers the sticks forming the same have come from all the groups of the stack. Subsequently the tiers of adhesively coated sticks are fed to a press or clamping means for the setting of the adhesive and the production of the desired composite board. The feeding, it will be apparent, is intermittent but it should also be observed that the pressing may be either intermittent or continuous, the latter form being described herein.

Bearing in mind that my invention is applicable to all manners of sticks, no matter what may be their origin, so long as they have fairly uniform rectangular cross-section, I shall describe the invention as it can be used in a plywood production mill. In Figure 1 is shown a sheet of plywood 10 as it appears when having the edges cut to dimension as by saws 12, thereby removing a trimming strip from the saws outward of the sheet. In order to convert these strips into useful sticks as 14, I have added a second pair of saws 16, which run alongside the sheet sizing saws and rip the trim strip into predetermined dimensions, and remove the waste 18 which usually has an uneven edge as shown in detail in Figure 2. Thus at one and the same time as a sheet is being sized, plywood sticks 14 are being produced. Of course trimmings could also be ripped to desired dimensions by a re-saw operation conducted separately from the sheet sizing operation.

The sticks 14 removed from the side edges of plywood panels appear as shown to the left in Figure 2 and have face plies 20, 22 which have the veneer arranged to extend generally in the direction of the axis of the stick and roughly parallel thereto. Internally of the face plies are the cross-bands 24, 26 having their grain direction substantially at right angles to the grain direction of the face plies and of the stick axis. Since all plywood is assembled of uneven numbers of plies there must also be a core ply 28 which has its grain running in the same direction as that of the face plies. In the case of three-ply plywood panels the direction of the grain in the core ply would be at right angles to that of the face plies and would lie as do the cross-bands of the stick shown in Figure 2. Trimmings obtained from the end edges of the plywood panel 10 would have an opposite arrangement of veneer as to the grain directions due to the fact that the sticks would be cut at right angles to those cut from the edges of the sheet.

For my purposes it is desirable in using plywood sticks to adhesively join in the composite board the faces of 21 and 23 of the surface plies of adjoining sticks in order that the best product be produced. This means, then, that the faces of the final composite boards will be formed by side edges 25, 27 of the sticks. This arrangement is shown in Figure 3 wherein may be seen two sticks 14 joined by an adhesive film 30 with the veneer edges exposed at the face of the composite board.

From the foregoing it can be seen that the manufacture of any substantial quantity of composite board involves the handling of great numbers of sticks that, since plywood sheets are relatively thin and have not too much trim material removed from them when they are sized, are quite small in cross-section. The handling of such sticks individually or even in two's or three's is undesirable because too much labor is involved and even with adequate labor supplied normal pressing means cannot be adequately serviced. For that reason I have devised the method of this invention. But first, I shall briefly describe the pressing and clamping means that I employ.

In essence such a press involves a supporting surface 32 at each end of which are pairs of resilient clamping jaws here designated by the numerals 34 and indicated by broad arrows as can be seen in Figures 5 and 4. Sticks in numbers forced between such jaws under substantial pressure will be held at the attained pressures even though the forcing means is withdrawn as is the case when a next quantity is to be inserted into the press. While the sticks are held by the jaws adhesive curing heat is generated by any suitable means such as the electric heater coil 36 to set the adhesive and bond the sticks together. When a following tier of sticks with adhesive applied between their abutting faces is presented to the press for insertion they are deposited on shelf 40 ahead of presser bar 42 which reciprocates over the shelf 40 and is moved by the piston rod of the pressure cylinder 44 that is connected to lever 46. As the pusher bar 42 moves toward the jaws 34 the tier is pressed upon the rear edge of preceding tiers of sticks within the press and shoved into the space between the entrance jaws 34. At the same time, a portion of the composite board that has been formed within the press is extruded therefrom through the exit jaws 34 at the other end of the press.

As is schematically shown in Figure 4, sticks to which glue has been applied are assembled in a rectangular stack 50 comprising a plurality of tiers of sticks in which the glued surfaces are substantially upright. Such a stack is held in a rack 52, preferably right angular, that lies adjacent a feeding surface 54 that may overlie the presser bar 42.

Tier after tier of sticks is removed from the stack and placed upon the inclined feed surface 54 where they are urged downward, tier after tier, for feeding to the presser mechanism by the reciprocating overhead dogging arm 56. At its lower end, arm 56 has a pivoted latch 58 which may be displaced against the urgence of spring 60 permitting the arm to swing to behind a tier of sticks and which will be solid and push on a tier as forward feeding is obtained. Means, not shown, is provided to reciprocally swing arm 56. While it should be apparent that the formation of the stack 50 may be had in many ways—piling it up stick-by-stick being one of the most obvious—it is of basic importance to my invention to do so in the most practical and economical manner. Such is illustrated in detail in the schematic perspective view of Figure 5 to which reference is made hereafter.

Pluralities of the sticks 14 are caused to move in a loose ribbon along a path determined by conveyor means such as belt 70. Such a ribbon can be assembled either by hand or mechanically from quantities of sticks and it is preferable, in the case of plywood sticks, that the face plies to which adhesive is to be applied lie flat with relation to the belt surface. Of course, normal wooden sticks would have their glue receiving surfaces upward and downward as well. The direction of movement of the ribbon of sticks is perpendicular to their axes and is past a glue applying means, as rollers 72, 74 which apply the adhesive film to the sticks. The operator aggroups from the ribbon an easily hand ed number of sticks, say eight to ten, that I designated as group 78 and feeds them end-first to the rollers 72, 74 which are of the normal type used in glue applications. In some cases only one roller may apply adhesive and in others both may do so. Choice here is exercised in accordance with the amount of adhesive that is required to obtain the desired glue film.

As the group 78 passes from the adhesive filming rollers it is caused to stand on edge as indicated in Figure 5 in the rack 52. This places the glue applied face, or faces as the case may be, in a substantially upright plane. Following groups are likewise racked to form the rectangular stack 50. Such a stack, as has been described, is composed of pluralities of groups standing upright side-by-side and, for removing purposes, comprises a plurality of generally horizontal tiers that are fed to the press as set forth above. The groups have glue films between them and the tiers do not. Through this stacking operation adhesive films which have been applied to several sticks at one time, and to a rather large surface, are disposed to lie between pairs of sticks that are to be joined together.

Some of the steps in assembling the wooden sticks into boards may be accomplished by machines, instead of by hand as described. The essential steps are described in the appended claims and are deemed to incompass various modifications, of the specific embodiment of the process described, which lie fairly in the scope of my invention. It is believed that I have described a novel method of assembling wooden sticks into boards, which is economical and efficient.

Having thus described my invention, I claim:

1. In the assembling of pluralities of wooden sticks of substantially uniform rectangular cross-section into a board in which said sticks are arranged in substantially parallel relationship with a film of adhesive disposed between adjacent faces, the method, comprising: aggrouping a plurality of sticks in side-by-side relationship to form a group, applying an adhesive film to a transverse face of said group, racking said group so that the adhesively filmed face of the group lies in an upright plane, sequentially repeating the operation for other similar groups and racking each in the manner of preceding groups alongside thereof so that the adhesive films are disposed between sticks of adjacent groups whereby said assembled groups form a rectangular stack, and sequentially unstacking said stack by tiers formed of pluralities of sticks having adhesive films between their adjacent faces.

2. The method according to claim 1 in which an adhesive film is applied to each of opposite transverse faces of each group.

3. In the assembling of pluralities of elongated wooden sticks of substantially uniform rectangular cross-section into a board in which said sticks are arranged in substantially parallel relationship with a film of adhesive disposed between adjacent faces, the method, comprising: moving a plurality of sticks side-by-side in a path having a direction perpendicular to the longitudinal axes of said sticks and said direction being to one side of glue applying means; passing end-first groups of said sticks past said glue applying means, while maintaining the side-by-side relationship of said sticks, and applying adhesive film to a face of each of the sticks co-planar throughout said group; stacking said groups side-by-side with the adhesively filmed faces of said groups in parallel planes and with the longitudinal axes of the sticks substantially horizontal, thereby forming a rectangular stack; and removing, from said stack, stick tiers formed of pluralities of side-by-side sticks having adhesive film between adjacent faces.

4. The method according to claim 3 including the step of applying adhesive film to a second co-planar but opposite face of the sticks of each of said groups as said groups are passing said glue applying means.

5. In the assembling of pluralities of elongated plywood sticks of substantially uniform rectangular cross-section into a board in which said sticks are arranged in substantially parallel relationship and the face veneers of the plywood sticks are juxtaposed and stand on edge in the board and an adhesive film is disposed between juxtaposed faces, the method, comprising: assembling a plurality of plywood sticks with their veneer faces aligned in a common plane; moving said plurality of sticks side-by-side in a path having a direction perpendicular to the longitudinal axes of said sticks and with the veneer faces lying substantially horizontal, said direction of travel being to one side of glue applying means; passing end-first groups of said sticks past said glue applying means, while maintaining the side-by-side relationship of said sticks, and applying adhesive film to a face of each of the sticks co-planar throughout said group and parallel to the plywood glue lines; stacking said groups side-by-side with the adhesively filmed faces of said groups in parallel planes and with the longitudinal axes of said sticks substantially horizontal, thereby forming a rectangular stack in which the veneer faces of the sticks are disposed substantially upright; and removing, from said stack, stick tiers formed of pluralities of side-by-side sticks having adhesive films between the adjacent veneer faces.

6. The method according to claim 5 including the step of applying adhesive film to a second co-planar but opposite face of plywood sticks of each of said groups as said groups are passing said glue applying means.

PER F. SKOOG.

REFERENCES CITED

The following references are of record in the file of this patent:

UNITED STATES PATENTS

| Number | Name | Date |
| --- | --- | --- |
| 1,078,776 | Dunton | Nov. 18, 1913 |
| 1,628,886 | Jackson et al. | May 17, 1927 |
| 2,037,259 | Murphy et al. | Apr. 14, 1936 |
| 2,191,070 | Cone | Feb. 20, 1940 |
| 2,300,728 | Goss | Nov. 3, 1942 |
| 2,373,500 | Pearce | Apr. 10, 1945 |
| 2,378,244 | Pfenning | June 12, 1945 |